United States Patent [19]
Muelleman

[11] Patent Number: 5,448,443
[45] Date of Patent: Sep. 5, 1995

[54] POWER CONDITIONING DEVICE AND METHOD

[75] Inventor: Norman F. Muelleman, Cary, Ill.

[73] Assignee: Suvon Associates, Cary, Ill.

[21] Appl. No.: 921,337

[22] Filed: Jul. 29, 1992

[51] Int. Cl.⁶ ............................................. H02H 9/04
[52] U.S. Cl. ..................................... 361/111; 361/42
[58] Field of Search ...................... 361/111, 42, 43, 44, 361/45, 46, 47, 48

[56] References Cited

U.S. PATENT DOCUMENTS

| | | | |
|---|---|---|---|
| 4,180,841 | 12/1979 | Engel | 361/45 |
| 4,573,098 | 2/1986 | Williston | 361/42 |
| 4,882,646 | 11/1989 | Genuit | 361/42 |
| 5,174,293 | 12/1992 | Hagiwara | 361/394 |
| 5,177,657 | 1/1993 | Baer et al. | 361/45 |

Primary Examiner—A. D. Pellinen
Assistant Examiner—Sally Medley
Attorney, Agent, or Firm—Charles F. Lind

[57] ABSTRACT

A power conditioning device protects sensitive electronics in modern electronic equipment from disruption or destruction caused by transients which can cause both induction and injection currents into the grounding system of the electronic equipment. This device nominally comprises an isolation transformer and a ground impedance between the earth ground connection from a distribution panel and the safety ground connection to the powered equipment. In addition, this device may also comprise a voltage clamping device such as an MOV and a capacitive filter to provide a complete power line conditioner. This device may be used in systems with guarded or driven grounds, or in a system with a high voltage reference to safety ground. In addition, ground conditioning can be added to a Ground Fault Circuit Interrupter (GFCI) to attenuate ground surge currents. The ground impedance may take many forms, including inductors, resistors, diodes, gas tubes, transformers, capacitors, or combinations of these or other components. The ground conditioning device may be used on power systems of different voltages and frequencies, including three phase power systems.

22 Claims, 9 Drawing Sheets

POWER CONDITIONING DEVICE AND METHOD

FIELD OF THE INVENTION

This invention generally relates to suppression of transients in electrical power systems, and, more specifically, relates to a power conditioning device and method for handling electrical faults within a power system while attenuating undesirable transients on the power lines which can damage sensitive electronic components in equipment coupled to the power lines.

DESCRIPTION OF THE PRIOR ART

Modern electronics can be destroyed by power line voltage transients. Voltage-clamping devices are well-known in the art, and are used to clamp power line voltage to a level that will not destroy sensitive electronics. The problem with this approach is that, while the voltage is clamped to a non-destructive level, the current transients that result from the voltage clamping can have effects just as destructive as a voltage transient.

U.S. Pat. No. 4,573,098 by Williston discloses a ground voltage suppression device. In one embodiment of the Williston device, a saturating inductor is placed between the neutral on the primary side of a distribution transformer (which is connected to Earth Ground) and the neutral on the secondary side of the distribution transformer. This configuration may reduce the difference in ground potential between the distribution transformer and the distribution panel, but can do nothing to attenuate ground current transients that occur on the consumer side of the distribution panel, where sensitive electronic equipment is typically plugged in.

Therefore, there existed a need to provide a power conditioning device and method which is used on the consumer side of the distribution panel, and which effectively attenuates power line transients in such a way that damage to sensitive electronic equipment is avoided.

SUMMARY OF THE INVENTION

It is an object of this invention to provide a power conditioning device and method for attenuating destructive transient ground currents in a power distribution system.

It is another object of this invention to provide a power conditioning device and method which is installed in an individual electronic product for protecting the electronics within the product from the destructive effects of transient voltages and currents.

It is a further object of this invention to provide a standalone power conditioning device and method which has a plug coupled to a standard power outlet and a receptacle wherein an individual electronic product may be plugged for protecting the electronics within the product from the destructive effects of transient voltages and currents.

It is yet another object of this invention to provide a power conditioning device and method for attenuating transient voltages and currents in a power distribution system.

It is still another object of this invention to provide a power conditioning device and method comprising a Ground Fault Circuit Interrupter (GFCI) and a ground impedance to attenuate transient ground currents to non-destructive levels.

According to the first embodiment of the present invention, a power conditioning device is provided which comprises an isolation transformer and a ground impedance. This device is connected to the consumer side of a power distribution panel in such a way that ground transient currents created during a power line transient are attenuated to levels that will not damage sensitive electronics within equipment powered by the distribution panel.

According to a second embodiment of the present invention, a power conditioning device is provided which comprises an isolation transformer, a ground impedance, a voltage clamping device, and a capacitive filter. This device assures that both voltage and current transients are attenuated to levels that will not damage sensitive electronics within equipment powered by the distribution panel.

According to a third embodiment of the present invention, a power conditioning device is provided which comprises a Ground Fault Circuit Interrupter (GFCI) and a ground impedance. This device attenuates ground transient currents to non-destructive levels while maintaining the needed protection of the GFCI, which is well known in the art.

The foregoing and other objects, features and advantages will be apparent from the following description of the preferred embodiment of the invention as illustrated in the accompanying drawings.

DESCRIPTION OF THE PREFERRED EMBODIMENT

Figure 1:
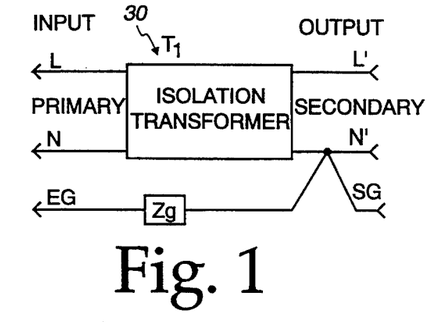
FIG. 1 is a block diagram of the power conditioning device of the first embodiment of the present invention.

Referring to the figures, FIG. 1 shows a block diagram of the ground conditioning circuit 30 of the present invention, comprising an isolation transformer T1 and a ground impedance Zg. The isolation transformer T1 is a standard isolation transformer having a primary to secondary winding ratio of 1:1. Alternating Current (AC) power is supplied to the primary leads L (Line), N (Neutral), and EG (Earth Ground) of isolation transformer T1, typically via a standard three-pronged electrical outlet (not shown). EG is a ground reference line that returns to earth potential with as little impedance as practical. EG comprises the ground line in a typical three-wire power distribution system, where the ground line and neutral line are typically tied together at earth ground potential at the distribution panel. The leads L', N' and SG (Safety Ground) are provided as a power source to the electrical equipment that requires protection from transient voltages and currents. SG is a near earth potential, low-impedance reference line used as a ground reference for equipment powered by L' N' and SG, and provides a return path to the isolation transformer T1 for load fault currents.

To understand the operation of ground conditioning device 30, one must first understand the characteristics of typical power line surges. Surge voltage data has been compiled by the Institute of Electrical and Electronic Engineers (IEEE) 587 Surge Voltage Working Group and published as ANSI standard C62.41. As might be expected, the worse case surge voltages were attributed to lightning strikes on the power line. The worse case surge voltage was noted to have a practical limit of ±6000 volts. This limit is governed by the conductor spacing of typical electrical wiring systems and devices.

Figure 2A:
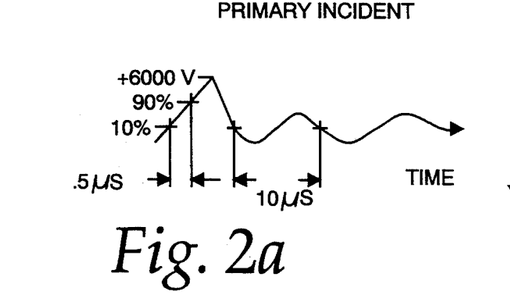
FIG. 2a is a waveform showing the voltage transient that occurs when lightening strikes the primary side of a power distribution transformer.
Figure 2B:
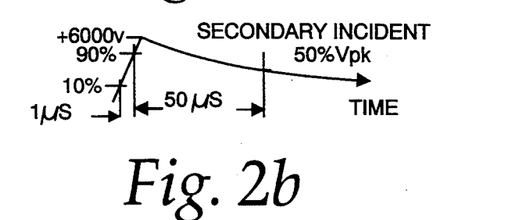
FIG. 2b is a waveform showing the voltage transient that occurs when lightening strikes the secondary side of a power distribution transformer.

The power line surges were further characterized by their rise time and decay time which is dependant on where the surge incident occurs along the power network, as shown in FIGS. 2a and 2b. If the incident occurs on the primary side of a distribution transformer then the incident appears as a 0.5 microsecond rise time impulse with a 100 kilohertz damped ring wave decay to zero, as shown in FIG. 2a. If the incident is on the secondary side of a distribution transformer then the incident is a unipolar impulse and has been characterized to have a 1.0 microsecond rise time and 50 microsecond decay time to half its peak value, as shown in FIG. 2b. These wave shapes are determined by the incident surge voltage interacting with the impedance of the distribution transformer.

Figure 3:
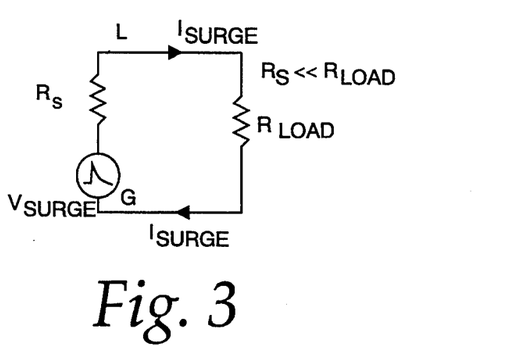
FIG. 3 is a schematic diagram of the surge currents that result in a typical circuit from impressed surge voltages.

In a simple two-wire power system, providing only L and G coupled to a resistive load Rload as shown in FIG. 3, there will be a surge current response (Isurge) to the incident surge voltage (Vsurge). Note that if the source resistance Rs is much smaller in resistance than Rload, the effect of Rs is small and can be neglected. To a first approximation, neglecting skin effect, the relationship will be governed by Ohm's law. Therefore, the surge current response will simply be:

$$Isurge = \frac{Vsurge}{Rload}$$

Isurge will be of equal magnitude in all parts of the network shown in FIG. 3.

Figure 4:
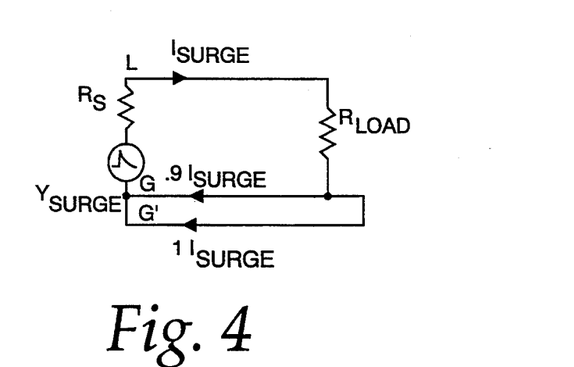
FIG. 4 is a schematic diagram of the circuit of FIG. 3 with the addition of an alternate ground return path.

If the two-wire network has an alternate return line for the surge currents, as shown in FIG. 4, then the return surge current will split up, proportionately, depending on the physical characteristics of the alternate return. Thus FIG. 4 shows a power distribution system which has L, G, and G' conductors. Typically, if the alternate return path G' is about 10 times as long as the main return G, and of the same conductor size measured by the American Wire Gauge (AWG) of the wire, then G' returns about 10% of the surge current to the source while the main return G returns 90% of the surge current. The proportion of current sharing is dependent on the AWG and length of the return conductors used.

Traditionally, surges on power lines have been characterized and documented as surge voltages. However, attendant with surge voltages are surge currents whose injection and effects on sensitive electronic equipment can be even more damaging than surge voltages. Surge currents are typically identified as either induction current or injection current.

Induction current results from a wire or other conductor forming a continuous closed current loop, encompassing some nonzero area. The loop acts as a single turn transformer secondary winding, which is susceptible to current induction from changing magnetic fields contained within the area of the current loop. As an example, if this current loop is adjacent to a power line with 10 Amps of steady state current and impulse current up to 30 or 40 Amps, and if all of the flux of the incident power line is coupled into the current loop, then 10 Amps of steady state current will be induced into the current loop along with the 30 to 40 Amps of impulse current. The power line becomes a single turn primary of a simple transformer where the secondary is the single turn current loop. Note, however, that most adjacent line to loop positioning is not geometrically conducive to efficient magnetic coupling and a range of coupling from 0.01% to 10% is more practical. Nonetheless, assuming a 10% coupling, 1.0 Amp of steady state current with impulses to 3.0 or 4.0 Amps could be induced into the current loop.

Figure 5A:
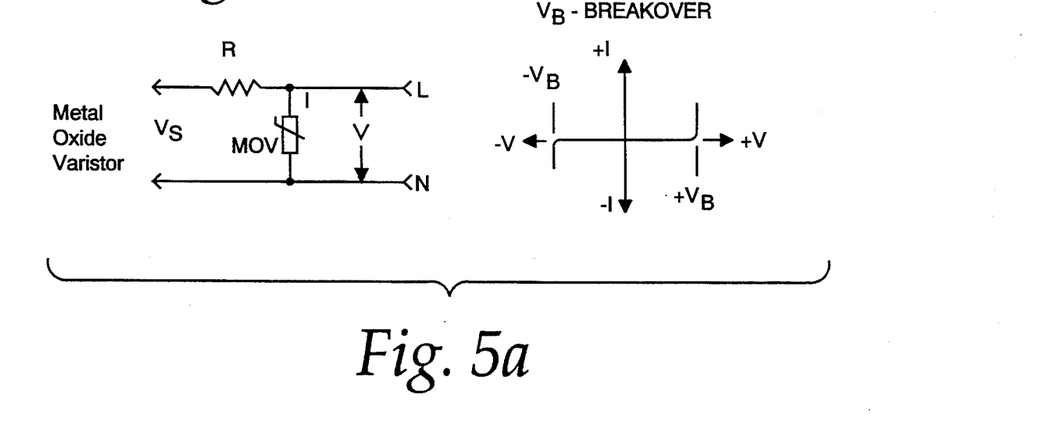
FIG. 5a is a schematic diagram of a Metal Oxide Varistor (MOV) and its associated voltage-current (VI) waveforms.
Figure 5B:
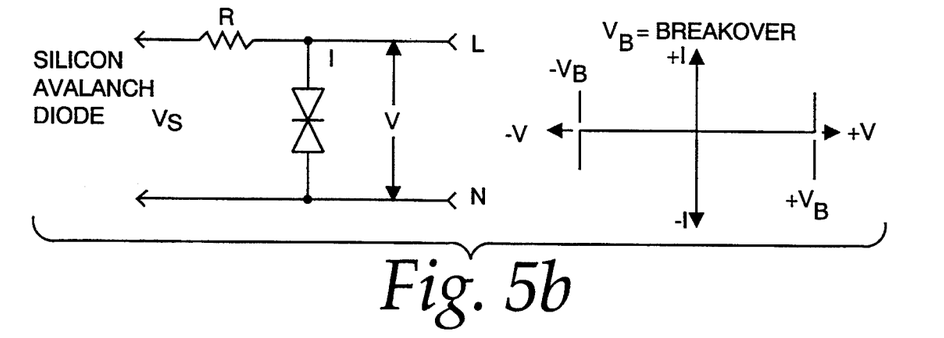
FIG. 5b is a schematic diagram of a Silicon Avalanche Diode and its associated voltage-current (VI) waveforms.
Figure 5C:
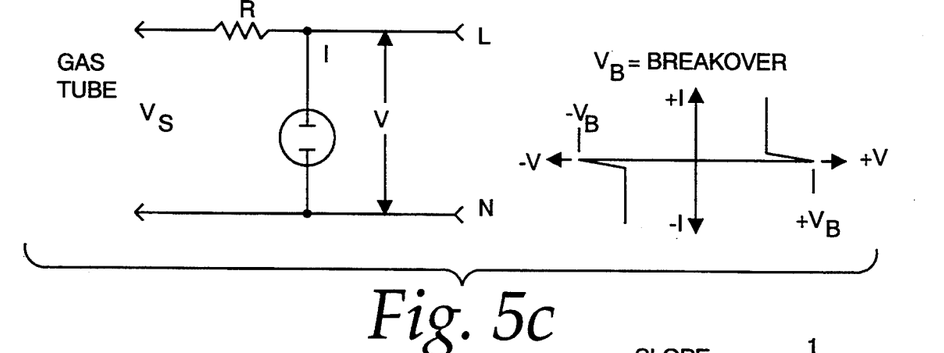
FIG. 5c is a schematic diagram of a Gas Tube and its associated voltage-current (VI) waveforms.

Injection currents can be injected into a power distribution system by voltage clamping devices such as Metal Oxide Varistors (MOVs), silicon avalanche zener diodes, gas discharge tubes or carbon blocks. A voltage clamping device has the electrical characteristic of being a high impedance component until the voltage across the terminals of the device exceed its breakover or clamping level. For terminal voltages at or above its breakover level, the device goes into a low impedance state and will conduct current very readily. The voltage versus current (V-I) characteristics of three of these voltage clamping devices is shown in FIGS. 5a–5c. Note the bidirectional breakover capability which is desirable for AC systems.

Figure 6:
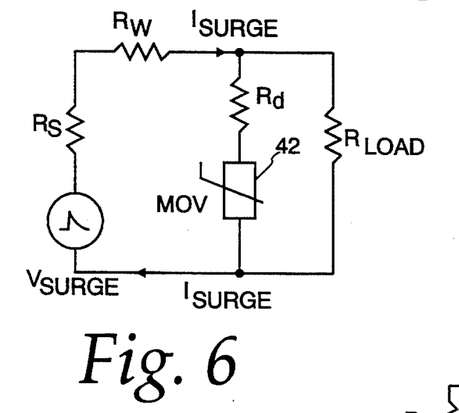
FIG. 6 is a schematic diagram of the circuit of FIG. 3 with the addition of an MOV.

Connecting an MOV, the voltage clamping device of FIG. 5a, across Rload in FIG. 3 results in the circuit shown in FIG. 6. The addition of MOV 42 modifies the surge current characteristics of the circuit. For surges of voltage magnitude equal to or less than the breakover level of the MOV 42, the surge current is governed by the same ohmic relationship that applies to the circuit of FIG. 3, namely:

$$I_{surge} = \frac{V_{surge}}{R_{load}}$$

If the surge voltage exceeds the breakover voltage Vb of the device, then the relationship becomes:

$$I_{surge} = \frac{V_{surge} - V_b}{R_{total}}$$

Figure 7:
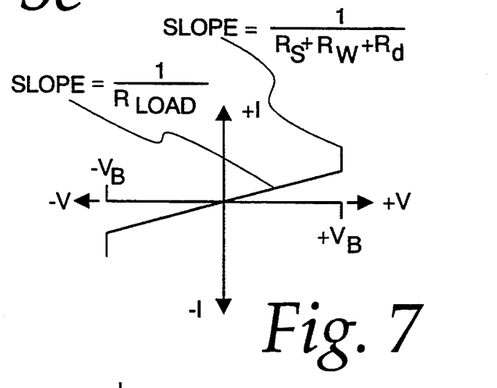
FIG. 7 is a graph showing the performance of the circuit of FIG. 6.

Rtotal is the summation of the MOV's intrinsic impedance Rd, the wire impedance Rw, and the impedance of the source Rs. As previously mentioned, Rs is much less than Rload. Rd and Rw are also very low resistances and considerably less than Rload. For this reason, up to this point the effects of Rw and Rs have been neglected. Rtotal, comprised of Rd, Rw and Rs, is therefore much less than Rload. FIG. 7 shows the V-I characteristics of the circuit in FIG. 6.

For typical voltage clamping devices used to protect resistive loads (such as computers), Rd is usually less than the sum of Rw and Rs. In fact Rw dominates Rtotal, and limits the rate of current change because of its intrinsic "skin effect", a non-dissipative, frequency sensitive, resistive component of all wires.

The source impedance, Rs, has been characterized by the IEEE 587 Surge Voltage Working Group with their respective short circuit current specification associated with each type of surge voltage. The ratio of the open circuit surge voltage and short circuit current defines the source impedance, Rs, of the surge generator. For instance, the ringwave shown in FIG. 2a has a short circuit current of 500 Amps. The upper limit on surge voltage, as previously noted, is ±6000 volts. Consequently, the surge type shown in FIG. 2a will have a source impedance Rs of 6000/500, or 12 Ohms. The unipolar wave shown in FIG. 2b has a short circuit current of 3000 Amps. Consequently, the surge type shown in FIG. 2b will have a source impedance Rs of 6000/3000, or 2 Ohms.

Figure 8:
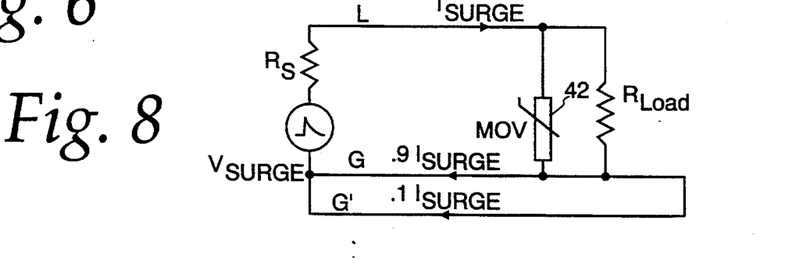
FIG. 8 is a schematic diagram of the circuit of FIG. 6 with the addition of an alternate ground return path.

Consider now what happens in systems which provide an alternate current return and which have a voltage clamping device connected across Rload, as shown in FIG. 8. Assuming the return lines have the same relationship shown in FIG. 4, Isurge will share proportionately between the respective return paths. For a worse case 3000 Amp surge, as much as 10%, or 300 Amps, could return through the alternate return line G'.

Figure 9:
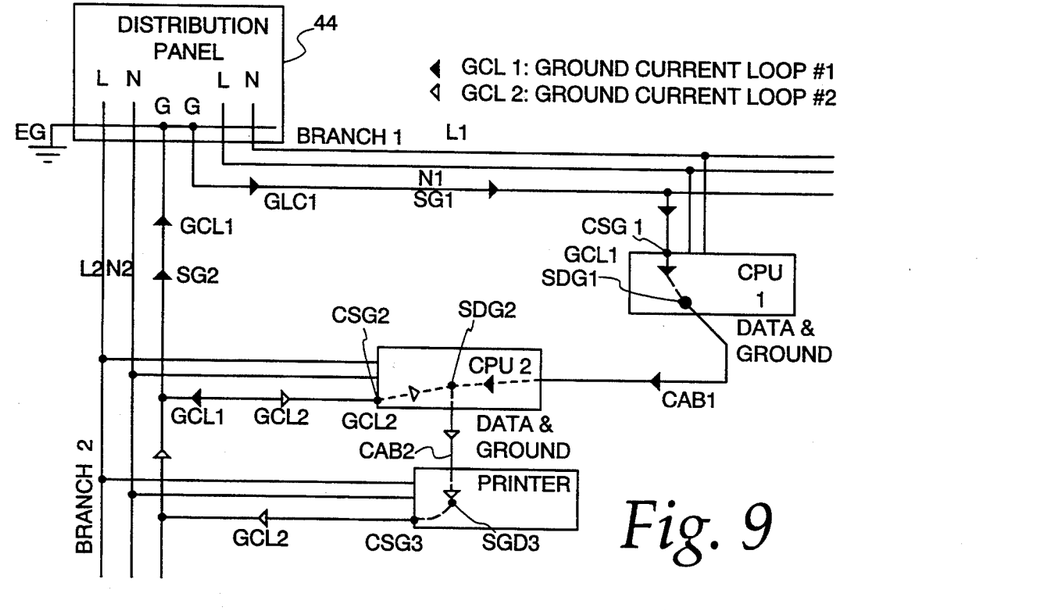
FIG. 9 is a block diagram of a typical power distribution system providing power to two computers and a printer, resulting in ground current loops.

FIG. 9 illustrates how this alternate return path G' shown in FIG. 8 can cause problems in electronic systems. This typical block diagram of a multiple interconnect computer system shows how ground current loops (GCLs) are formed. GCLs provide the means for alternate returns of injected ground surge currents.

A current loop referred to as GCL 1 is formed by the power line safety ground feeding from the Distribution Panel 44 down line SG1 of Branch 1, attaching to the chassis safety ground CSG1 of CPU 1, which then connects to the data line ground reference at point SDG1 in CPU 1 known as safety data ground. The safety-data ground SDG1 is connected to a cable CAB1, which couples data and ground lines of CPU 1 and CPU 2 together. CAB1 connects the safety data ground SDG1 of CPU 1 to the safety data ground SDG2 of CPU 2. SDG2 then connects to the chassis safety ground CSG2 of CPU 2, which in turn connects to line SG2 in Branch 2, and finally back to the Distribution Panel 44 where all power line safety grounds are electrically tied together and then to earth ground EG.

A second current loop GCL 2 is formed by the power line safety ground feeding from the Distribution Panel 44 down line SG2 of Branch 2, attaching to the chassis safety ground CSG2 of CPU 2, which then connects to the data line ground reference at point SDG2 in CPU 2 known as safety data ground. The safety-data ground SDG2 is connected to a cable CAB2, which couples CPU 2 and the Printer together. CAB2 connects the safety data ground SDG2 of CPU 2 to the safety data ground SDG3 of the Printer. SDG3 then connects to the chassis safety ground CSG3 of the Printer, which in turn connects to line SG2 in Branch 2.

Ground loops occur in this manner because of the National Electric Code (NEC) and Underwriters Laboratory (UL) requirements for low impedance fault current return through the safety ground system. Typically, safety agencies require safety ground impedances of 0.1 Ohms or less through the equipment. As discussed previously, these safety-data ground current loops provide a means by which external magnetic fields can induce surge currents into the system electronic components, CPU 1, CPU 2, and Printer. Thus, ground current loops become shorted single turn secondaries by which induction currents can be injected into the system ground.

Figure 10:
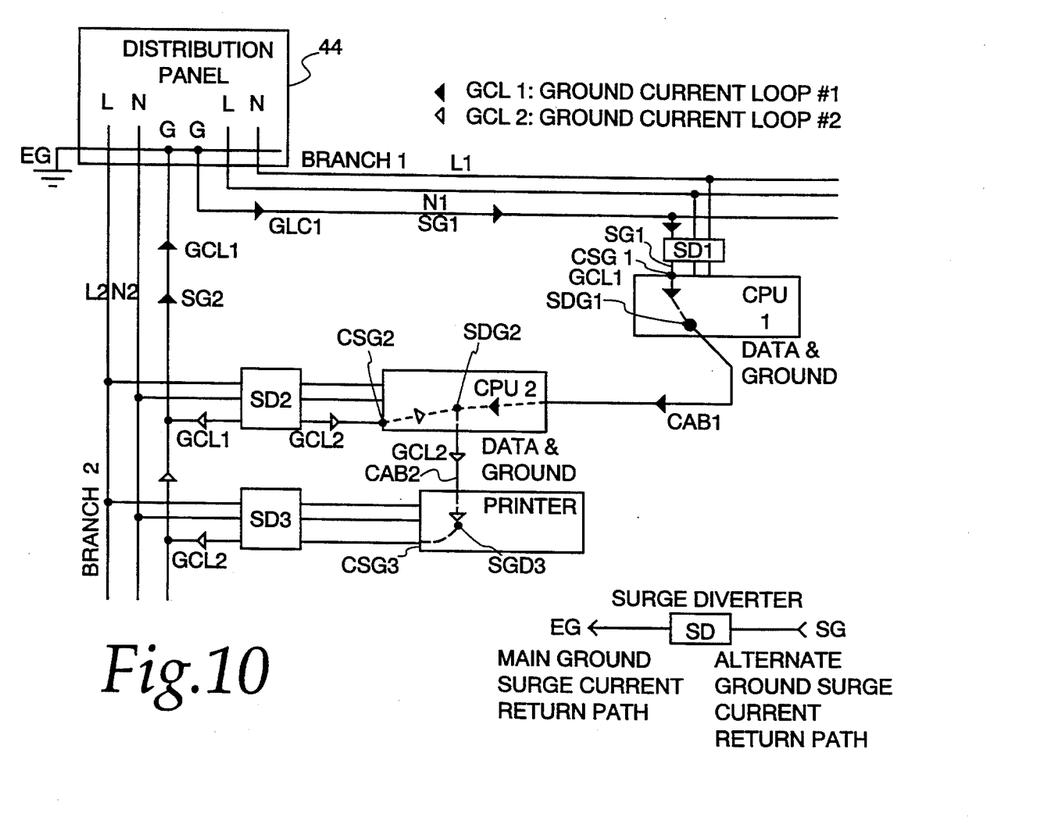
FIG. 10 is a block diagram of the system of FIG. 9 including the use of surge diverters.

Another way that surge currents can be introduced into the system is from injection currents caused by voltage clamping devices, commonly referred to as surge diverters (SDs). FIG. 10 shows the computer system of FIG. 9 with the addition of some inexpensive surge diverters applied to each system component to provide "economical surge voltage protection." The surge diverters probably do an adequate job of limiting voltages in the hot (L) and neutral (N) lines. However, as discussed above, surge diverters also convert those surge voltages into surge currents on the safety ground, and hence, into the system data ground.

An analysis of the power system shown in FIG. 10 will demonstrate how surge diverters can create problems in computer systems. With regards to CPU 1, if a surge voltage is incident to Branch 1, for whatever reason, the majority of surge current will return along the neutral N1 line. But as illustrated in FIG. 8, a portion of the surge current will also conduct down any parallel return paths. Thus a surge voltage which causes the surge diverter SD1 to clamp the voltage will also cause SD1 to inject surge current into the safety ground SG1. This surge current can return to its source by at least three different paths. The main return line will be the Branch 1 earth ground connection EG1 to the surge diverter SD1. Alternate surge current paths will be via the data line to CPU 2 as well as the data line back to the Printer. In addition, part of the surge current from CPU 1's surge diverter SD1 is also propagating through the chassis safety ground system of CPU 2 with the risk of causing problems or damaging components in CPU 2.

In the foregoing discussion of current loops and surge currents, only the grounding interconnect system of safety-data ground was considered susceptible to these transient impulses. Note that the same reasoning can be applied to the hot (L) and neutral (N) lines of the power distribution system; they, too, could be coupling for surge voltages on the power line. They have the same surge voltage conversion process and they also could form current loops. However, the hot (L) and neutral (N) lines have a distinct advantage that helps immunize these lines from the same problem that befalls the grounding system: impedance immunity from safety issues. Impedance immunity means that hot and neutral lines are not subjected to the same low impedance requirement as the safety ground, and they can therefore have an impedance inserted into these two lines without affecting safety issues. Usually, somewhere in the power distribution system some kind of impedance blocks the formation of copper-continuous (Galvanic) current loops in the hot and neutral lines while also helping to block the surge voltage propagation. Typically, that impedance is a transformer that isolates hot (L) and neutral (N) lines from the components that ultimately use the power. An example of this concept is shown in FIG. 11.

Figure 11:
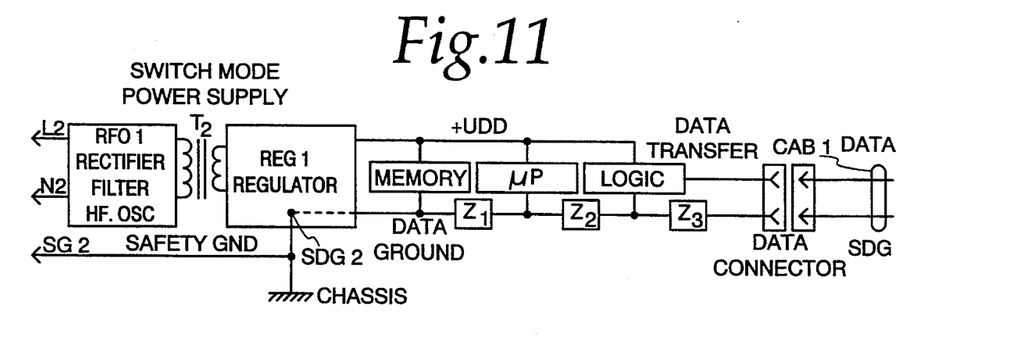
FIG. 11 is a block schematic diagram of CPU 2 shown in FIGS. 9 and 10.

FIG. 11 shows the components in a typical power interface chain for electronic systems such as CPU 2. Note that the switch-mode power supply high frequency transformer T2 between the input rectifier/filter/oscillator RFO1 and the output logic supply regulator REG1 provides isolation between L, N and their respective secondary outputs of the transformer T2. Transformer T2 breaks the continuity of L and N, thereby blocking any tendency for the L and N lines to form current loops. Further, the transformer will also have the tendency to block surge voltages trying to propagate down the L and N lines with respect to ground ("common mode surge voltages"). Notice also that surge voltages from L to N will be severely attenuated or absorbed by the filter within RFO1. Thus, the transformer T2 is a major component for blocking or absorbing all hot and neutral surge voltage or currents, but it does nothing to block or absorb surge currents on the ground lines.

Wiring interconnect schemes in most contemporary computers have shielding techniques to minimize either internal or external sources of Electro-Magnetic Interference (EMI). Typically, conductive planes are used for logic voltage and ground distributions on printed circuit boards, or PCBs. Conductive planes also provide shielding to data lines. Strip lines, a pair of side by side source and return lines, are another PCB technique for data line shielding. Twisted pair wires and/or miniature coaxial cables are used for connections external to the PCB.

All of these techniques are effective for immunizing locally or externally generated EMI, but they do nothing to shield, block, attenuate or absorb surge currents trying to propagate through a CPU safety-data grounding system. The reason is that there is no adjacent return path for the surge currents that will cancel the electric and magnetic fields of the current surge, such as occurs with signals propagating down a twisted pair, coaxial cable, strip line or ground plane. In fact, the physical positioning or proximity of the safety-data ground wiring will probably have more impact on whether or not the surge current will affect system performance.

The damaging effects of surge currents through a computer's ground system can be illustrated with the circuit of FIG. 11. The electrical impedance of wiring across a wide frequency band consists of inductance, resistance and skin effect. The impedance of an inductance is higher if there are no nearby "current return" electromagnetic fields that would cancel the external fields of the incident pulse. Remembering that FIG. 11 represents the configuration of CPU 2 in FIG. 10, these complex impedances caused by the wiring interconnects between components within CPU 2 are represented in FIG. 11 by impedances Z1, Z2 and Z3 in the current return or ground path between the data cable CAB1 and the safety ground SG2. With normal operational current levels, the effect of impedances Z1, Z2 and Z3 is negligible. However, with larger current levels such as surge currents, the impedances Z1, Z2 and Z3 can generate voltages comparable to the logic levels of the system, thereby disrupting proper operation of CPU 2. Further, if those voltages significantly exceed the high or low latch-up thresholds for the silicon integrated circuits within CPU 2, the risk of component destruction is very high. Thus, a model has been developed to demonstrate how ground surge currents can be disruptive or destructive in computer systems.

As previously mentioned, surges on the hot (L) and neutral (N) lines are blocked or severely attenuated by an impedance in these lines. A desirable solution to the surges on the safety-data ground line would be an impedance that would block or severely attenuate ground surge currents. While an impedance could be arbitrarily inserted in the safety ground, which would sufficiently attenuate ground surge currents, the risk of jeopardizing safe fault current detection by the upstream over current protectors (circuit breakers or fuses) precludes this possibility. Further, as noted earlier, safety agencies such as UL require safety ground impedances in power interface equipment of 0.1 Ohm or less at 60 Hz. Even if it were possible to build a toroidal inductor that would have sufficiently wide band impedance to attenuate ground surge currents, fault currents would still have to pass through this impedance imposed in the safety ground and thus safety protection would be subject to the long term reliability and integrity of this toroidal inductor. The device 30 of the present invention does not affect fault current protection while at the same time severely attenuating ground surge currents.

Figure 12:
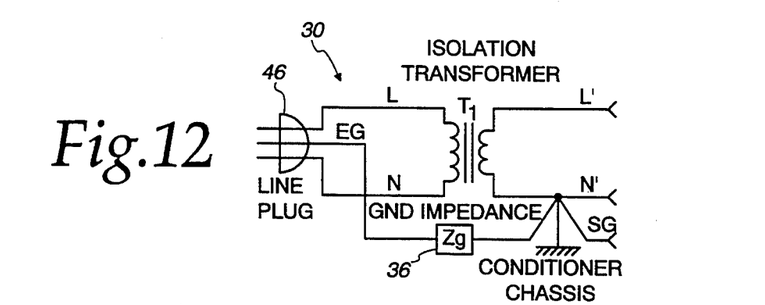
FIG. 12 is a schematic diagram of a particular implementation of the first embodiment of the device of the present invention shown in FIG. 1.

FIG. 12 shows a more detailed application of the device 30 of FIG. 1 when used in conjunction with a typical piece of electronic equipment, such as CPU 1 in FIG. 9. Notice that device 30 is coupled to a three prong line plug 46, which is plugged into a typical 110 Volt wall receptacle (not shown). In device 30, a ground impedance Zg is inserted between the EG and SG lines. SG is connected to the chassis ground of the computer. SG and EG are insulated from each other, so the ground impedance Zg effectively blocks surge currents from traveling between the two. An important feature of the device 30 is that fault current detection of the external over current protectors remains unimpeded.

Figure 13:
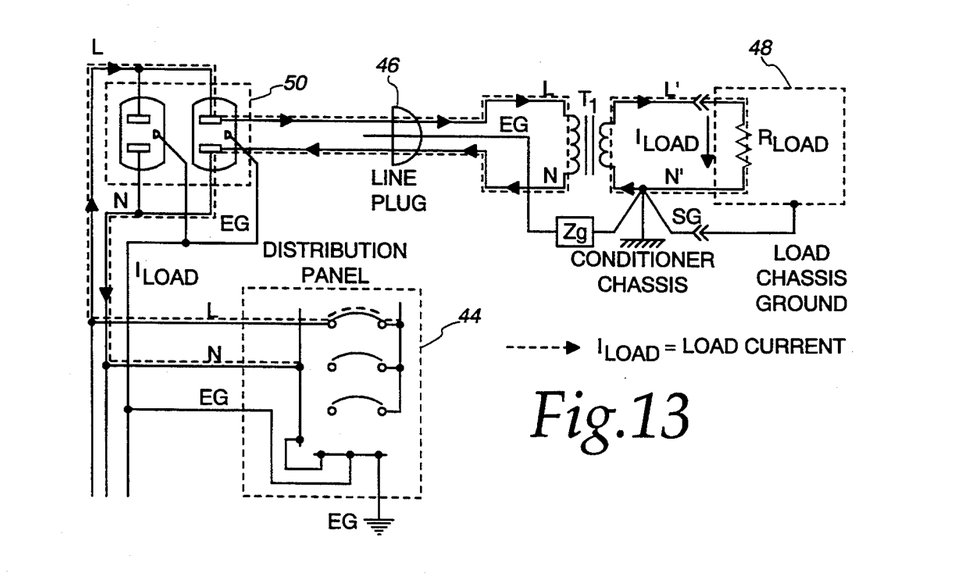
FIG. 13 is a schematic diagram of the device of FIG. 12 showing that normal load currents do not flow through the ground impedance.

FIG. 13 shows the device 30 used in conjunction with an upstream current protector located in Distribution Panel 44 and powering a typical load Rload in a metallic chassis 48. Although Rload is shown as resistive, it could be even more complex such as the input impedance of a switch-mode power supply for a computer. FIG. 13 shows the normal current path for power on the hot line L from the Distribution Panel 44 to the line receptacle 50 to the line plug 46 to the transformer T1, then back to the Distribution Panel 44 on the neutral line N. The current flowing from L to N on T1 creates a current Iload on the secondary of T1 flowing from L' through Rload to N' as shown. Note that normal load current Iload is not required to flow through ground impedance Zg.

Figure 14:
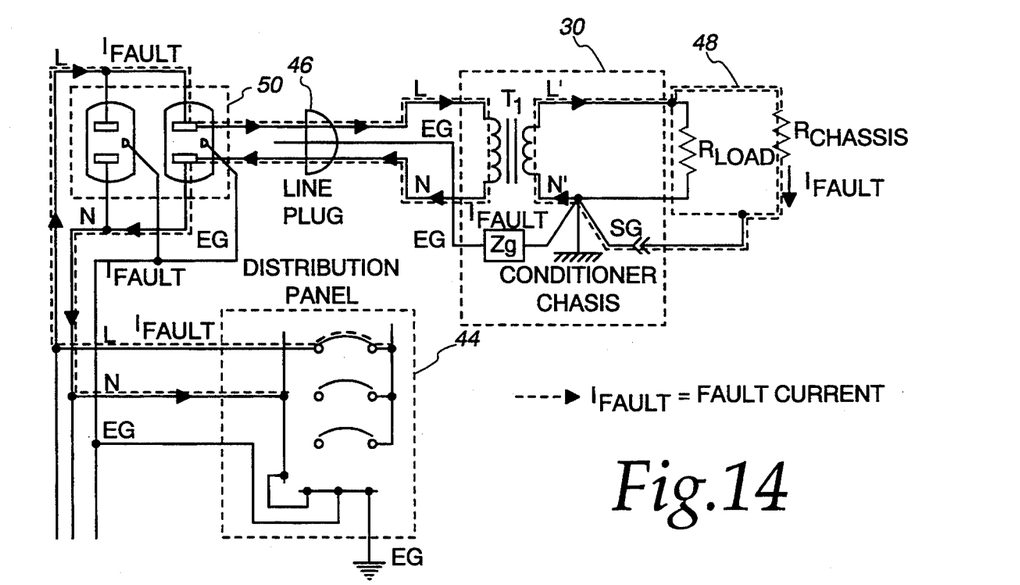
FIG. 14 is a schematic diagram of the device of FIG. 12 showing that fault currents do not flow through the ground impedance.
Figure 15:
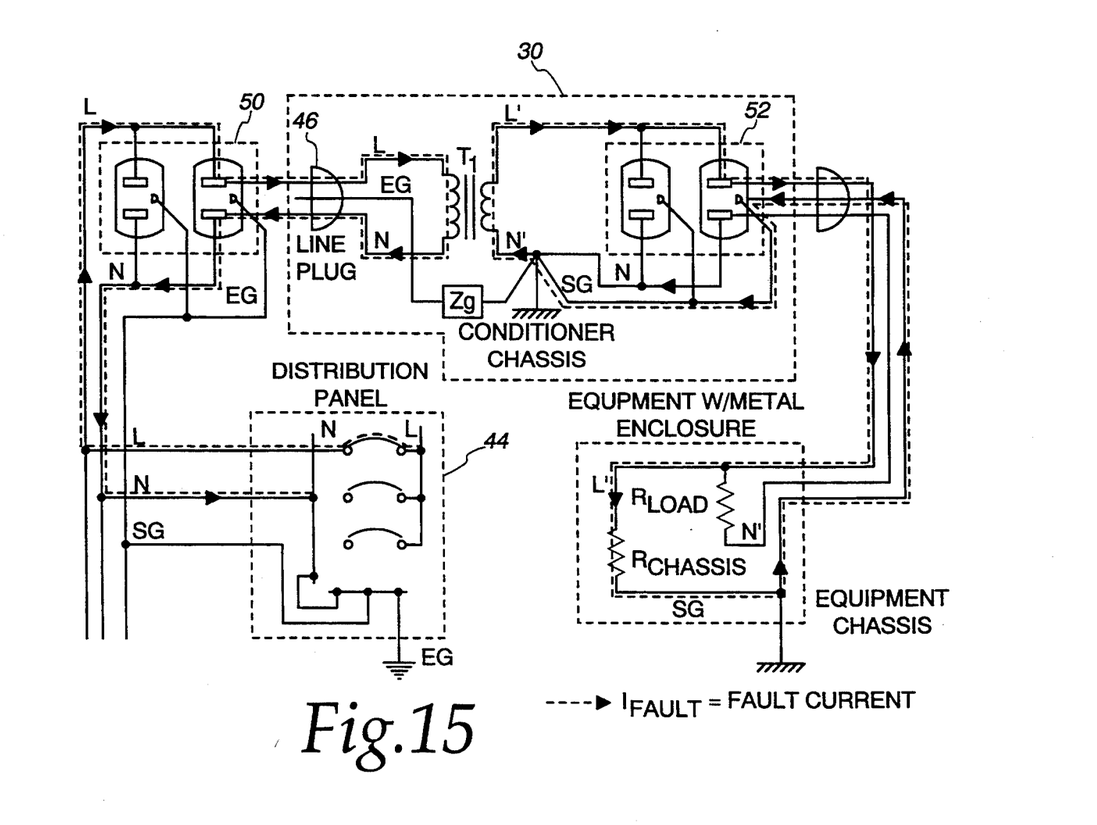
FIG. 15 is a schematic diagram of the device of FIG. 12 in a stand alone configuration.

Next, in FIG. 14 a fault condition inside the chassis is shown as a low resistance connection from hot L' to chassis. Note that with the configuration shown in FIG. 14, the fault current Ifault is not required to flow through the ground impedance Zg. Therefore by inserting an impedance Zg into the input earth ground reference circuit, the fault current detection properties of the circuit are not affected. The circuit configuration of FIG. 14 is appropriate if the device 30 is built into the equipment to be protected. However, device 30 can also be constructed as a stand alone unit as shown in FIG. 15, having a line plug 46 and a receptacle 52 where the equipment to be protected is plugged in.

Figure 16:
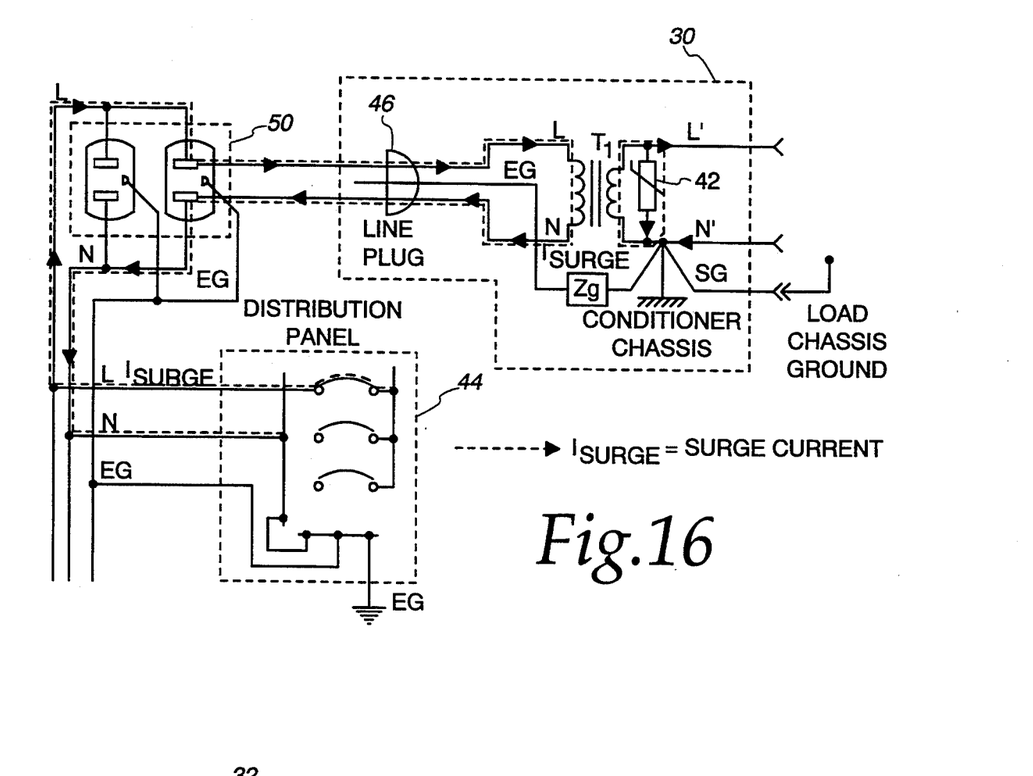
FIG. 16 is a schematic diagram of the circuit of FIG. 14 with the addition of an MOV, showing that surge currents through the MOV do not flow through the ground impedance.

FIG. 16 shows the effect of adding a voltage clamping device such as MOV 42 to the device 30 of the present invention. If MOV 42 is placed between the L' and N' lines as shown, any current injected into the circuit by the MOV 42 flows from L' through MOV 42 to N' and through the secondary of transformer T1 as shown. The surge currents are therefore confined exclusively to the hot L' and neutral N' lines of the secondary of transformer T1 and reflected back via magnetic coupling to the primary hot L and neutral N lines. In this manner surge currents are confined exclusively to hot L and neutral N of the branch power line, unaffected by ground impedance Zg.

Figure 17:
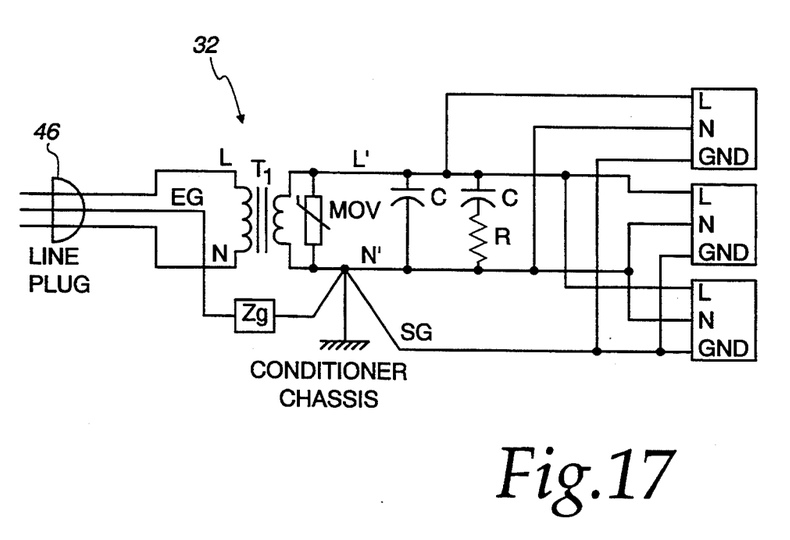
FIG. 17 is a schematic diagram of the second embodiment of the device of the present invention, which includes an MOV and capacitive filters to provide complete power line conditioning.

Notice that the device 30 of FIG. 16, with a voltage clamping device such as MOV 42 in place, forms the heart of a transformer based power line filter, also known as a power conditioner. The only remaining component to complete the design is an appropriately designed filter on the secondary of the isolation transformer T1. FIG. 17 shows the configuration of device 30 that forms a complete power conditioner 32, which is the second embodiment of the present invention. It is obvious to those skilled in the art that the manner of connecting power to the input of power conditioner 32, and the manner of connecting the output of power conditioner 32 to electrical equipment can vary according to the requirements of the particular application. In one application, power conditioner 32 is a stand alone device with a line plug 46 that plugs into a wall receptacle, and with receptacles where the electrical equipment is plugged in. In a second application, power conditioner 32 is built into the equipment to be protected.

Figure 18:
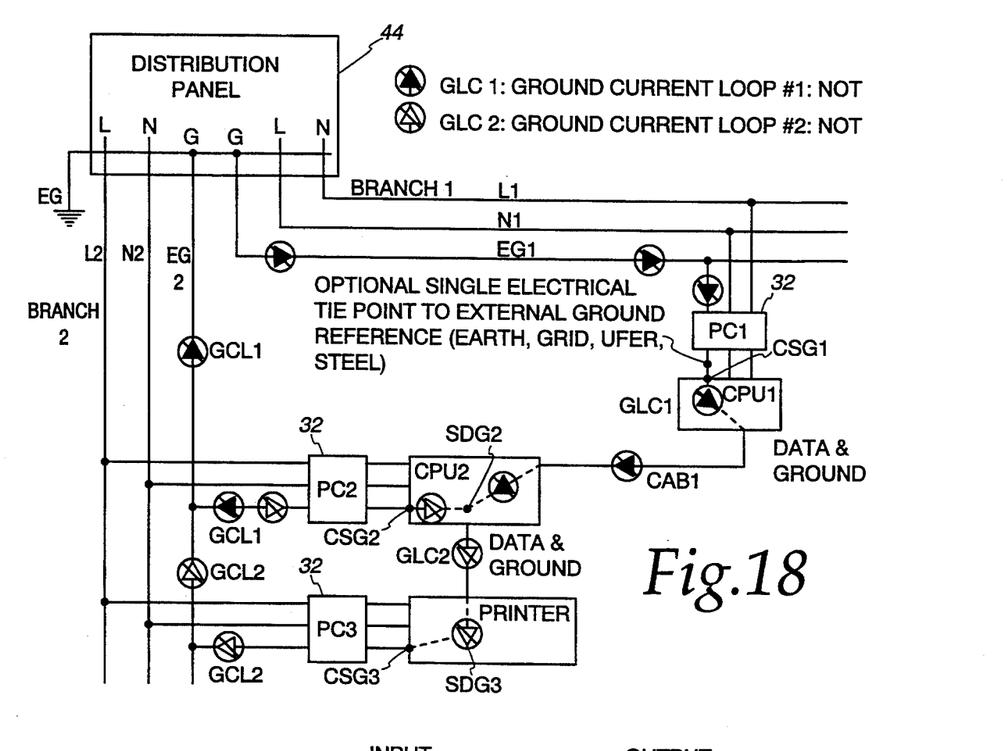
FIG. 18 is a block diagram of the power distribution system of FIG. 10 wherein the surge diverters have been replaced with the device of FIG. 17, thereby breaking all ground current loop paths.

FIG. 18 shows how the power conditioner 32 of FIG. 17 can effectively break the ground current loops shown in FIG. 10. Note that each power line interface to equipment has a power conditioner 32. These power conditioners 32 effectively break GCL 1 and GCL 2 so that no low impedance alternate return paths for the surge current are provided. In this manner the sensitive electronics within CPU 1, CPU 2, and the Printer will be protected from the damaging effects of ground surge currents and power line surge voltages and currents by their respective power conditioners PC1, PC2 and PC3. Note that the ideal configuration for protecting equipment coupled to a power distribution system is to provide one power conditioner for each piece of equipment. In this manner each is independently protected from voltage surges, while eliminating paths for ground current surges between different equipment. The ground current loops could be broken equally well using device 30 of the first embodiment. However, device 32 of the second embodiment provides the added protection of voltage clamping and filtering between the L' and N' lines.

If a device 32 is provided for each piece of electrical equipment as shown in FIG. 18, one (and only one) external reference ground can be connected to the Optional Single Electrical Tie Point as shown with minimal compromising of ground protection. For instance, if electric shielding is enhanced by connection to either a separate earth ground, a grid floor tie, steel frame tie or ufer ground, then it can be done with the Optional Single Electrical Tie Point with minimal effect on surge current and surge voltage protection.

Figure 19A:
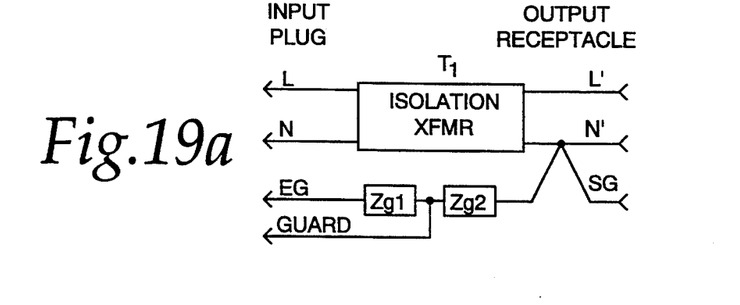
FIG. 19a is a block diagram of an alternative configuration for the ground conditioning device of FIG. 12 which has two ground impedances.
Figure 19B:
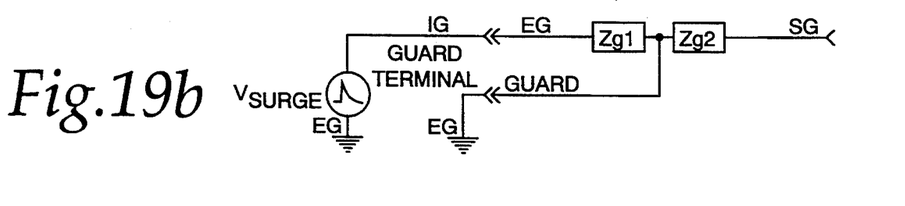
FIG. 19b is a block diagram of the external connections to the circuit of FIG. 19a to form a guarded grounding scheme.

FIG. 19a shows an alternative configuration of device 30 shown in FIG. 1. Rather than a single impedance Zg in FIG. 1, two impedances Zg1 and Zg2 are provided, with an additional Guard terminal as shown. This Guard terminal allows surge voltages on EG to be further attenuated. For example, if EG is plugged into an isolated ground wiring system and other equipment is putting surge voltages on the EG line (by surge diverters, for instance) then if the Guard terminal was connected to a clean alternate ground return as shown in FIG. 19b, a ground surge attenuator is formed. Ground surge currents into SG by voltage surges on EG are further reduced.

Figure 20:
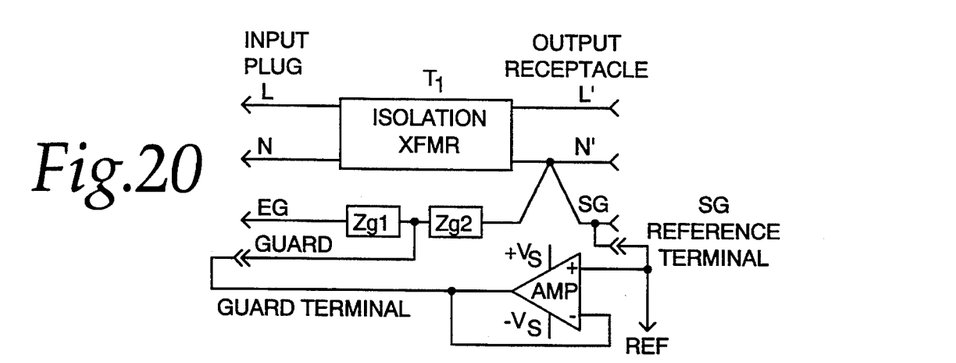
FIG. 20 is a block diagram of the device of FIG. 19a with the addition of a differential amplifier to form a driven grounding scheme.

The Guard terminal of FIG. 19a can serve as an input from an active device which provides a driven grounding configuration, as shown in FIG. 20. For the driven grounding scheme as shown, the differential amplifier AMP provides a buffering reference service. This differential amplifier AMP as shown is configured as a voltage follower, driving its output, and therefore the Guard terminal, to the voltage level on the REF input. Surge voltages and currents that try to come into the SG by way of input EG will be absorbed by the output of the differential amplifier AMP and shunted harmlessly to the power supplies +Vs and −Vs of the amplifier. In this manner surge voltages and currents on EG are effectively blocked from passing to SG.

Figure 21:
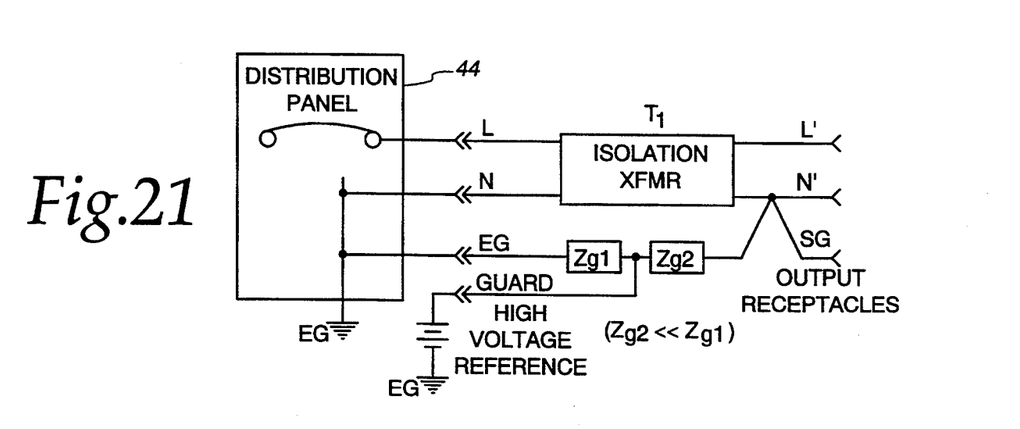
FIG. 21 is a block diagram of the device of FIG. 19a with a high voltage reference connected to the guard terminal, creating a high voltage reference.

FIG. 21 shows a configuration where SG is referenced to a high voltage reference. Note that equipment and personnel may still operate or touch equipment that is connected to the output receptacles as long as they are adequately insulated from EG up to the High Voltage Reference potential. If the equipment develops a short to chassis, fault currents will propagate back to the distribution panel in the same way as previously discussed. All other aspects of the circuit in FIG. 21 operate the same as for the circuit shown in FIG. 1.

Figure 22:
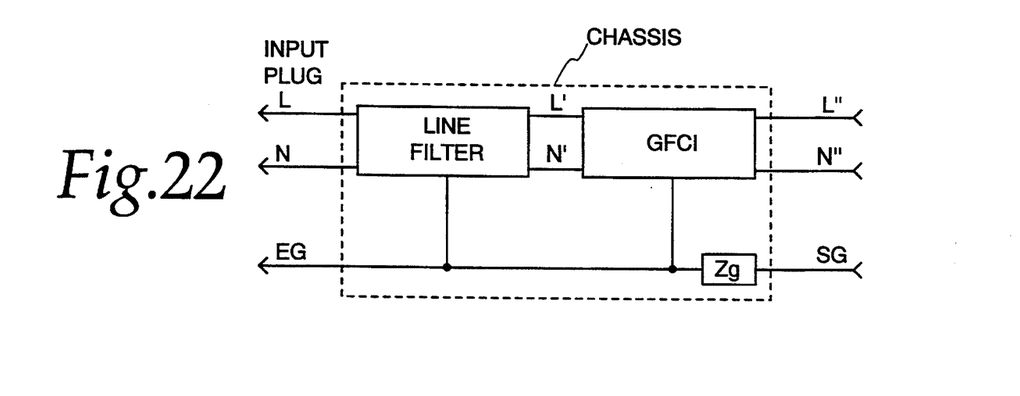
FIG. 22 is a block diagram of the third embodiment of the present invention showing the ground impedance used in conjunction with a Ground Fault Circuit Interrupter (GFCI) and a line filter.

In the third embodiment of the present invention, ground conditioning is added to other systems as well, as illustrated in FIG. 22. Here, the ground impedance Zg is added to a Ground Fault Circuit Interrupter (GFCI) as shown. A Line Filter is connected as shown to attenuate voltage transients. By placing Zg between EG and SG as shown, surge voltages and currents on EG are severely attenuated before reaching SG, while still providing the conventional protection of a GFCI, which is well known in the art.

The specific devices used in ground impedance Zg may vary according to the desired performance parameters of the power system. Zg may be a toroidal inductor, a cross-core inductor, a resistor, a diode, a gas tube, a capacitor, another transformer, or combinations of these components. The specific materials used in each of these components may vary without departing from the scope of the present invention. Neither the type nor construction of the ground impedance Zg is a limiting factor in the application of the device 30 disclosed herein.

Figure 23A:
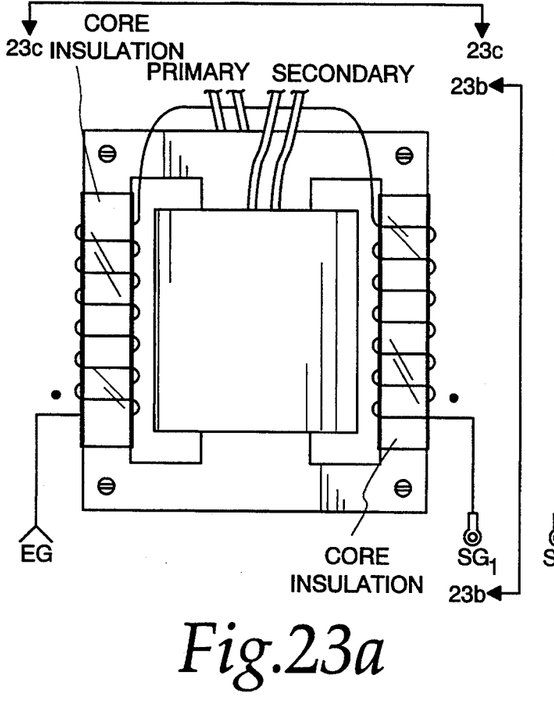
FIG. 23a is a front view of a specific implementation of the isolation transformer used in the device of FIGS. 12 and 17 showing how the ground impedance is formed using the outer legs of the isolation transformer as a core for an inductor.
Figure 23B:
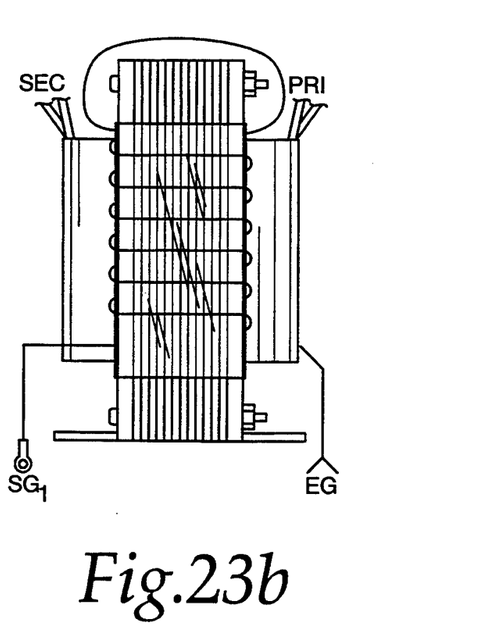
FIG. 23b is a side view of the transformer shown in FIG. 23a taken along the line 23b-23b.
Figure 23C:
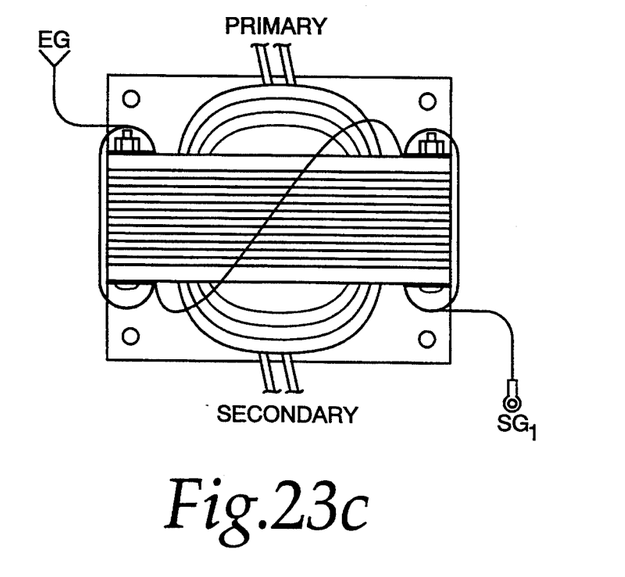
FIG. 23c is a top view of the transformer shown in FIG. 23a taken along the line 23c-23c.

One specific implementation of the ground impedance Zg is to use the outer legs of isolation transformer T1 as the core for an inductor which makes up ground impedance Zg. This configuration is shown in FIGS. 23a-23c. The EG line coming from the line plug is wrapped around the two outer legs of transformer T1 as shown, thereby forming an inductor as the ground impedance Zg. The Ground Attachment Terminal is connected to SG on the secondary side of the transformer. In this manner the transformer T1 serves as the transformer and the ground impedance Zg, eliminating the need for additional components.

The specific example shown in the drawings for illustrative purposes is a standard three wire, 60 Hz, 120 Volt AC power line of the type that supplies power to conventional household receptacles in the United States. While this configuration is illustrated, it is obvious to those skilled in the art that the device 30 of the present invention could also be applied to power systems with other frequencies of operation, such as 50 Hz and 400 Hz power systems, or even with higher frequency systems such as those found in switching power supplies. In addition, the device 30 could also be used to suppress ground currents in three phase power systems of different operating frequencies.

While the invention has been described in its preferred embodiment, it is to be understood that the words which have been used are words of description rather than limitation, and that changes may be made within the purview of the appended claims without departing from the true scope and spirit of the invention in its broader aspects. For example, it is obvious from the disclosure herein that the function of the isolation transformer T1 could be performed by a standard step-down transformer used in many linear power supplies, or by a transformer used in many switching power supplies. This would be particularly applicable if the device of the present invention is built into the equipment to be protected. Thus a transformer already built into the equipment could serve as the isolation transformer T1 of device 30.

What is claimed is:

1. A device for suppressing transient currents in a three-wire power distribution system powering a grounded electrical load, the distribution system providing alternating current power at a reference frequency and separate voltage and reference potentials, and providing a reference ground, comprising the combination of:

isolation transformer means having primary and secondary windings providing respective input and output terminals, said input and output terminals being magnetically coupled while being isolated from direct electrical connection to each other, said input terminals being electrically coupled to the alternating current power, the input terminals respectively being comprised as voltage and reference inputs and said output terminals respectively being comprised as voltage and reference outputs, said output terminals being electrically coupled to the electrical load, the isolation transformer then isolating the electrical load from the power distribution system, and the electrical load around and the reference output being electrically coupled together as a safety ground; and electrical inductive impedance means, electrically coupled in series between the safety around and the reference around, for providing electrical isolation between said safety ground and said reference ground.

2. The device of claim 1, comprising the electrical impedance means having a first impedance having first and second ends, said first end of said first impedance being coupled to said reference around; a second impedance having first and second ends, said first end of said second impedance being coupled to said safety around; and said second end of said first impedance being coupled to said second end of said second impedance, providing thereat a guard input to said electrical impedance means.

3. The device of claim 2, further comprising said guard input being coupled to clean alternate reference ground.

4. The device of claim 2, further comprising amplifier means having an output coupled to said guard input and having an input coupled to said safety around for actively driving said output to the same voltage potential as said safety ground.

5. The device of claim 2, further comprising said guard input being coupled to a high voltage reference input and said first impedance having an impedance value substantially larger than said second impedance.

6. The device of claim 1, further comprising voltage clamping means coupled between said output terminals for clamping said voltage between said output terminals at a predetermined level.

7. The device of claim 1, further comprising voltage clamping means coupled between said output terminals for clamping said voltage between said output terminals at a predetermined level; and capacitive filter means coupled between said output terminals for attenuating voltage transients between said output terminals.

8. The device of claim 1, further comprising a case for housing the isolation transformer means and electrical impedance means, a connecting cord coupled to the input terminals of the isolation transformer means and extended from the case and having plug thereon for establishing a separable electrical coupling with an outlet receptacle formed as part of the power distribution system, and an outlet receptacle on the case and electrically coupled to the output terminals of the isolation transformer means for establishing a separable electrical coupling with the electrical load via a plug thereon being coupled with the outlet receptacle.

9. The device of claim 1, further comprising the electrical impedance means being formed as an inductor in the form of a wire wound around unused core structure of the isolation transformer means.

10. The device of claim 1, further comprising the electrical impedance means being formed of first and seconds impedances each having first and second ends, said first ends of the impedances being coupled together at a guard input to said electrical impedance means, said second end of the first impedance being coupled to said reference ground and the second end of the second impedance being coupled to said safety ground, and the impedances being formed as inductors.

11. The device of claim 10, further comprising said guard input being coupled to a clean alternate reference ground.

12. The device of claim 10, further comprising amplifier means having an output coupled to said guard input and having an input coupled to said safety around for actively driving said output to the same voltage potential as said safety ground.

13. The device of claim 10, further comprising said guard input being coupled to a high voltage reference input and said first impedance having an impedance value substantially larger than said second impedance.

14. The device of claim 10, further comprising a case for housing the isolation transformer means and electrical impedance means, a connecting cord coupled to the input terminals of the isolation transformer means and extended from the case and having a plug thereon for establishing a separable electrical coupling with an outlet receptacle formed as part of the power distribution system, and an outlet receptacle on the case and electrically coupled to the output terminals of the isolation transformer means for establishing a separable electrical coupling with the electrical load via a plug thereon being coupled with the outlet receptacle.

15. A device for suppressing transient currents in a three-wire power distribution system powering a grounded electrical load, the distribution system providing alternating current power at a reference frequency and separate voltage and reference potentials, and providing a reference around, comprising the combination of:

ground fault circuit interrupter means having input and output terminals electrically coupled together respectively in a first mode of operation and electrically isolated respectively in a second mode of operation, said input terminals being electrically coupled to the alternating current power end respectively being comprised as voltage and reference inputs and said output terminals respectively being comprised as voltage and reference outputs, said output terminals being electrically coupled to the electrical load, the interrupter means being electrically coupled to the reference ground, and the electrical load having a safety ground, and the interrupter means changing from said first mode of operation to said second mode of operation when current differentials above a predetermined threshold is detected at said output terminals; and electrical inductive impedance means electrically coupled in series between the safety ground and the reference ground, for providing electrical isolation between said safety ground and said reference ground.

16. The device of claim 15, further comprising a line filter coupled between the input terminals for attenuating voltage transients between the voltage and reference potentials of the alternating current power.

17. A method for suppressing transient currents in a three-wire power distribution system powering a grounded electrical load, the distribution system providing alternating current power at a reference frequency and separate voltage and reference potentials, and providing a reference ground, comprising the steps of:

magnetically coupling the alternating current power voltage and reference potentials and the electrical load via isolation transformer means, and electrically coupling the load ground to the reference potential and forming thereby a separate safety ground; and electrically inductive impedance means electrically coupled in series between the safety ground and the reference ground, for providing electrical isolation between said safety ground and said reference ground.

18. The method of claim 17, and further clamping the voltage coupled between said output terminals at a predetermined level; and attenuating voltage transients between said output terminals with capacative filter means coupled between said output terminals.

19. The method of claim 17, and further forming the electrical impedance means by coupling first and second impedances together at first ends thereof, and coupling the remote ends of the first and second impedances respectively to the reference ground and to the safety ground, and the common first ends between the first and second impedances providing a guard input to said electrical impedance means.

20. The method of claim 19, and further coupling said Guard input to a high voltage reference input.

21. The method of claim 19, and further driving the guard input with an amplifier to the same voltage potential as the safety around.

22. The method of claim 19, and further coupling a line filter between said souce of alternating current power and said input terminals for attenuating voltage transients on said source of alternating current power.

* * * * *

UNITED STATES PATENT AND TRADEMARK OFFICE
CERTIFICATE OF CORRECTION

PATENT NO. : 5,448,443

DATED : September 5, 1995

INVENTOR(S) : Norman F. Muelleman

It is certified that error appears in the above-indentified patent and that said Letters Patent is hereby corrected as shown below:

Claim 1, column 12, lines 31, 35 and 36 (each occurrence), delete "around" and insert --ground--;

Claim 2, column 12, lines 42 and 44 (each occurrence), delete "around" and insert --ground--;

Claim 4, column 12, line 54, delete "around" and insert --ground--;

Claim 12, column 13, line 33, delete "around" and insert --ground--

Claim 20, column 14, line 55, delete "Guard" and insert --guard--;

Claim 21, column 14, line 58, delete "around" and insert --ground--.

Signed and Sealed this

Thirtieth Day of April, 1996

Attest:

BRUCE LEHMAN

Attesting Officer

Commissioner of Patents and Trademarks